United States Patent
Kusaki et al.

(10) Patent No.: US 6,263,204 B1
(45) Date of Patent: *Jul. 17, 2001

(54) SWITCHING CENTER FOR MOBILE HANDOVER

(75) Inventors: Tsutomu Kusaki, Yokohama; Kenichi Sakamoto, Tokyo; Masaru Murakami; Takashi Yokoyama, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/602,670

(22) Filed: Jun. 26, 2000

Related U.S. Application Data

(63) Continuation of application No. 08/968,066, filed on Nov. 12, 1997, now Pat. No. 6,108,546.

(30) Foreign Application Priority Data

Nov. 15, 1996 (JP) .................................................... 8-304422

(51) Int. Cl.⁷ ...................................................... H04Q 7/22
(52) U.S. Cl. ........................ 455/439; 455/67.3; 370/333
(58) Field of Search ................................... 455/436, 437, 455/442, 438, 439, 445, 502, 503, 67.1, 67.3; 370/331, 332, 333, 334, 335, 336

(56) References Cited

U.S. PATENT DOCUMENTS 5,434,853 * 7/1995 Hemmady et al. .................. 370/335

* cited by examiner

*Primary Examiner*—Lester G. Kincaid
(74) *Attorney, Agent, or Firm*—Sofer & Haroun, LLP.

(57) ABSTRACT

In a mobile communication system having an ATM-processed transfer path, a non-instantaneous interrupt handover can be realized. In a mobile communication network including an ATM-processed transfer path, when a mobile station is moved between cells during communication, frames are received to be identified by a mobile switching center. The frames contain the same data received from both base stations covering the cell range at asynchronous timing different from each other. A selection is made of header information with the lowest error rate from the header information of these frames. The frames are connected at instructed timing. Also, the frames to be transmitted to a plurality of base stations are duplicated, and then transmission timing is specified from these header information. These duplicated frames are transmitted at the specified transmission timing, so that the non-instantaneous interrupt handover is carried out.

7 Claims, 12 Drawing Sheets

FIG.5

| CONNECTION NUMBER | HANDOVER INFORMATION | | CHANNEL NUMBER | SIMULTANEOUS CONNECTION NUMBER |
|---|---|---|---|---|
| | NON-INSTANTANEOUS INTERRUP HANDOVER ON/OFF | MAXIMUM SIMULTANEOUS CONNECTION NUMBER | | |
| 12586 | Off | 1 | 4596 | 1 |
| | | | — | — |
| 93756 | On | 2 | 8935 | 1 |
| | | | 3342 | 2 |
| 53912 | Off | 1 | 7920 | 1 |
| | | | — | — |
| ⋮ | ⋮ | ⋮ | ⋮ | ⋮ |

FIG.6

| CONNECTION NUMBER (551) | MAXIMUM SIMULTANEOUS CONNECTION NUMBER (552) | FRAME NUMBER (554) | SIMLTANEOUS CONNECTION NUMBER (555) | SYNTHESIZING PARAMETER (556) |
|---|---|---|---|---|
| 93756 | 2 | 568 | 1 | 2 |
| | | | 2 | 4 |
| | | 569 | 1 | 3 |
| | | | 2 | 5 |
| | | ⋮ | ⋮ | ⋮ |
| 12681 | 2 | 281 | 1 | 5 |
| | | | 2 | 4 |
| | | 282 | 1 | 5 |
| | | | 2 | 3 |
| | | ⋮ | ⋮ | ⋮ |
| ⋮ | ⋮ | ⋮ | ⋮ | ⋮ |

(553 points to FRAME NUMBER column)

FIG.12
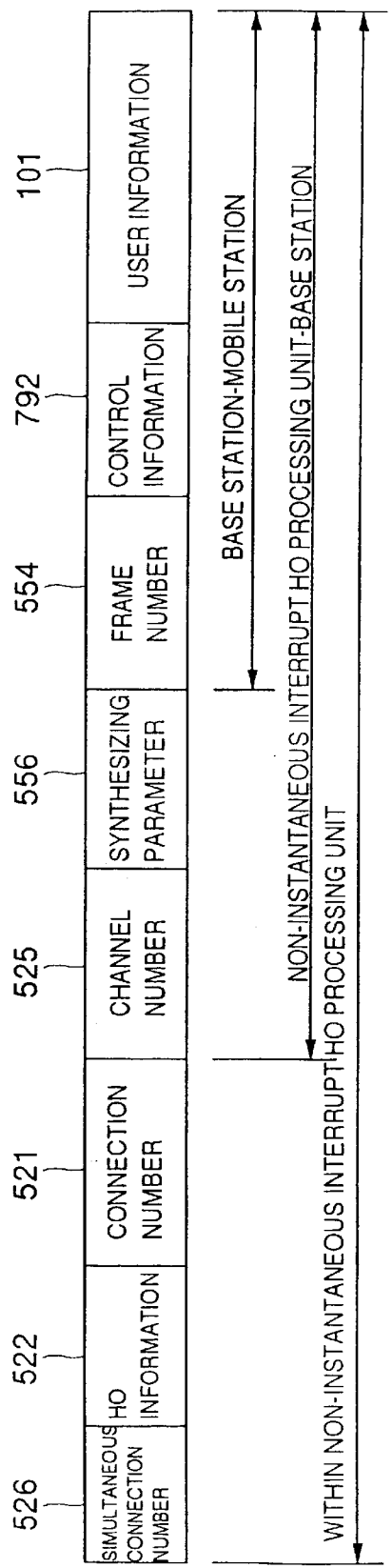
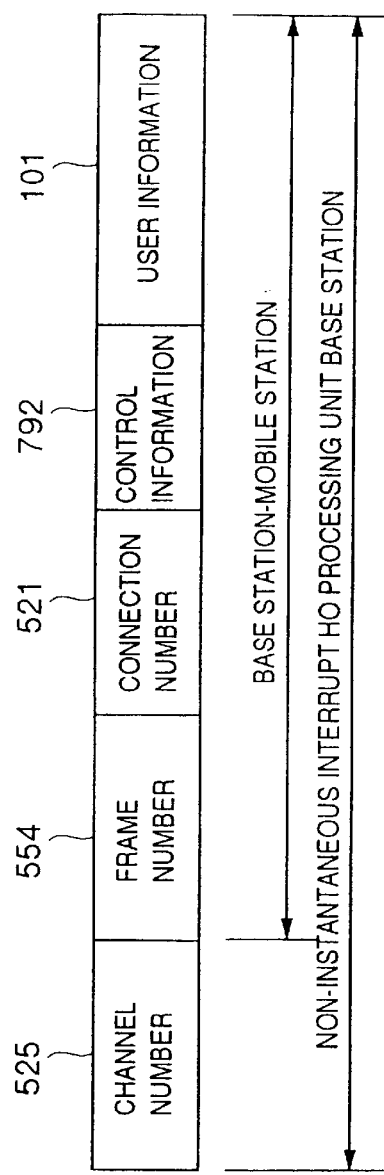

SWITCHING CENTER FOR MOBILE HANDOVER

CROSS REFERENCES TO RELATED APPLICATIONS

This is a continuation of application Ser. No. 08/968,066 filed on Nov. 12, 1997, now U.S. Pat. No. 6,108,546, and is incorporated herein by reference.

BACKGROUND OF THE INVENTION

The present invention is related to a non-instantaneous interrupt handover method and an apparatus capable of realizing such a non-instantaneous interrupt handover in a mobile communication system.

In mobile communication systems with using the CDMA (code division multiple access) system, non-instantaneous handover is realized. For instance, wireless (radio) interfaces are defined based upon the EIA/TIA/IS-95 standard as the portable telephone standard system in USA. Similarly, this EIA/TIA/IS-634 defines interfaces between base stations and a mobile switching center.

In these mobile communication systems, the soft handoff or soft handover techniques have been employed as the service area switching techniques during communications. In this soft handover technique, a plurality of communication paths are set at the same time between mobile stations and a mobile switching center, and the same communication data is transmitted/received via a plurality of these communication paths. Data having a low error rate is selected, or the same communication data is synthesized with each other on the reception side, so that the data communication with the low error rate is performed. As a consequence, when the channels are switched during the handover, no discontinuity is produced in the channel under use. Thus, no data drops out, and the handover can be realized without any instantaneous interrupt.

However, the above-described prior art technique owns such an initial condition that the data transfer operation in the mobile communication system is carried out in the STM system (synchronous transfer system). For instance, when the synchronization of the frames containing the respective data is maintained in the transfer path between the base stations and the mobile switching center, the frames are transmitted/received only in the specific timing. As a result, the control unit of the mobile switching center merely makes up the relationship between the specific slot and the connection in the transfer path, but need not especially perform the synchronizations in unit of slot and frame during the transmission/reception operations. As a result, even the soft handover is initiated, the data of the respective slots received at the same time, or the specific timing different from each other can be compared with each other and can be selected. Even when the same data is transmitted to each of the plural base stations, if the same data are duplicated and the duplicated data are transmitted by way of the slots for the handover, than the data of the corresponding slot are synthesized, and selected on the side of the base station, or the mobile stations. Thus, the non-instantaneous handover (soft handover) can be readily realized.

On the other hand, one proposal has been made so as to increase the line utilization efficiency by using ATM (asynchronous transfer)-processing having the above-described transfer path and to transfer each of the above-described data by using the ATM cells.

Even when this asynchronous system is employed in the transfer path, there is a first problem that the continuity of the information during the handover must be maintained.

Also, when the above-described transfer path is ATM-processed, as previously described, the relationship between the transmission/reception timing, the connection, and the channel cannot be exclusively specified.

There is a second problem. That is, in the mobile switching center, either the cell or the frame should be identified which contains the same data related to the same handover from a plurality of data received in the mutually different asynchronous timing from the base stations.

Also, there is a third problem. That is, the connection is specified in unit of the cell, or the frame received from the base station, and the judgement is made as to whether or not the handover is initiated in connection therewith. These comparing process and selecting process must be sequentially carried out in unit of the cell, or the frame.

Furthermore, there is a fourth problem. That is, if the handover is initiated, then either the cells or the frames to be transmitted to the base station are duplicated. Thereafter, these duplicated cells or frames should be transmitted at the same time in such timing that the delays and the flickers determined based on the negotiations with the base stations are minimized.

SUMMARY OF THE INVENTION

An object of the present invention is to provide such a mobile communication system capable of realizing non-instantaneous interrupt handover even when a transfer path of an asynchronous system is present between mobile stations and a mobile switching center such as the above-described transfer path.

Further, another object of the present invention is to provide a means for identifying either a cell or a frame containing the same data related to the same handover from a plurality of data received from base stations at mutually different asynchronous timing in the mobile switching center in the above-described mobile communication system while non-instantaneous interrupt handover is initiated.

Moreover, another object of the present invention is to provide a means for comparing the respective error rates of the identified cells or frames, for selecting such a cell or frame having the smallest error rates, and for transmitting this cell or frame having the smallest error rate at instructed timing.

A still further object of the present invention is to provide such a means for duplicating data to be transmitted to the base stations, and for transmitting either the cells or the frames containing the duplicated data at the same time in specific timing in the mobile switching center in the above-described mobile communication system while non-instantaneous interrupt handover is initiated.

To achieve the above-described objects, according to an aspect of the present invention, in a mobile communication system arranged by a plurality of mobile stations, a plurality of mobile stations, a plurality of base stations for storing therein these mobile stations, and a mobile switching center for storing therein these stations, either a cell or a frame containing the same data related to the same handover is identified based on header information thereof from a plurality of data received from the base stations at mutually different asynchronous timing; error rates of the identified frames are compared with each other to select the frame having the smallest error rate; this cell or frame having the smallest error rate is transmitted at instructed timing; data which should be transmitted to the base stations are duplicated from information (header information) related to this data; and either cells or frames containing the duplicated data are transmitted at the same time at such transmission timing specified from the header information thereof.

Also, according to another aspect of the present invention, a handover method of a mobile communication system in a wireless communication system constituted by a base station communicated with a plurality of wireless stations, and a mobile switching center connected to a plurality of said base stations, is featured by comprising: a step for initiating a handover process operation in order that while any of the wireless stations is connected to a first base station, the any wireless station should be newly connected to a second base station irrelevant to the first base station; a step such that the wireless station is newly connected to said second base station while keeping the connection with said first base station by the wireless station; a step such that the first and second base stations convert the transmission information from the wireless station into an ATM cell and then transmits the ATM cell to the mobile switching center; a step such that the mobile switching center receives a first ATM cell transmitted by the first base station and a second ATM cell transmitted by the second base station; a step such that the first ATM cell and the second ATM cell, which are received at asynchronous timing, are synthesized with each other; a step for calculating error rates of the first and second ATM cells synchronized with each other; a step for selecting such an ATM cell whose error rate is lower than that of the other ATM cell; and a step such that when such a condition that the error rate of the second ATM cell exceeds the error rate of the first ATM cell becomes a normal condition, the connection between the wireless station and the first base station is cut out.

Also, according to the present invention, the step for synchronizing the first ATM cell with the second ATM cell, which are received in the asynchronous timing, corresponds to a step for temporarily storing the first and second ATM cells received in the asynchronous timing into a buffer so as to be synchronized with each other.

Also, the handover method of the present invention is further comprised of a step for discarding the ATM cell having the higher error rate.

According to another aspect of the present invention, a communication method is featured by comprising: a step such that a plurality of the base stations separately receive information transmitted from the same mobile wireless station in a parallel manner; a step such that the base stations superimpose the received information on an asynchronous frame and transfers the superimposed asynchronous frame to the information processing station; and a step such that when the information derived from the same mobile station is superimposed on the asynchronous frame via the plurality of base stations and then the asynchronous frames are transferred, the information processing station selects an asynchronous frame having a better condition from the asynchronous frames.

Also, according to another aspect of the present invention, a communication method is featured by comprising: a step such that the mobile station adds a frame transmission order to frames to be transmitted; a step such that a plurality of the base stations separately receive information transmitted from the same mobile wireless station in a parallel manner; a step such that the base stations convert the received frame into an asynchronous frame and transfers the converted asynchronous frame to the information processing station; and a step such that when the information derived from the same mobile station is superimposed on the asynchronous frame via the plurality of base stations and then the asynchronous superimposed frames are transferred, the information processing station selects an asynchronous frame having a better condition from the asynchronous superimposed frames to which the same transmission order has been added.

Also, according to the present invention, the same transmission order corresponds to a connection number specifically determined every time a single communication is established.

Also, a communication method, according to another aspect of the invention, is featured by comprising: a step such that the mobile station adds to a frame, information for indicating whether or not a handover process operation is initiated; a step such that a plurality of the base stations separately receive frames transmitted from the same mobile wireless stations in a parallel manner; a step such that the base stations convert the received frames into asynchronous frames and then transfer the converted asynchronous frames to the information processing station; a step for judging information for indicating whether or not the handover process operation is under initiation, which is added to the frame; and a step such that when the judgement result indicates that the handover process operation is under execution, the information processing station causes the asynchronous frames transferred from the same mobile station via the plurality of base stations to be stored into a buffer, selects such an asynchronous frame having a better condition, and outputs the selected asynchronous frame, whereas when the judgement result indicates that the handover process operation is not under execution, the information processing station directly outputs the received asynchronous frame.

Further, a handover method of the invention is featured by comprising: a step for initiating a handover process operation in order that while any of the wireless stations is connected to a first base station, the any wireless station should be newly connected to a second base station irrelevant to the first base station; a step such that the wireless station is newly connected to the second base station while keeping the connection with the first base station by the wireless station; a step such that the mobile switching center duplicates down-stream information to the mobile wireless stations, the number of which is equal to the number of the base stations for executing the handover process operation; converts the duplicated down-stream information into ATM cells; and transmits the ATM cells to the first and second base stations equal to handover sources; a step such that the base station receives the ATM cells transmitted from the mobile switching center and then transmits the received ATM cells to the mobile wireless terminal; and a step for cutting out a connection with any one of the base stations.

Moreover, according to the invention, the mobile switching center is comprised of the steps of: recognizing whether or not a frame containing data to be transmitted to the mobile wireless terminals belongs to a connection of any end-to-end; applying such a number indicative of the same frame transmission order to a frame which is judged as the same connection by the recognizing step; duplicating the frame to which the frame transmission order number has been applied to obtain a plurality of such frames whose number is equal to a total number of the base stations which execute the handover process operation; and synchronizing the duplicated frames with each other and transmitting the synchronized duplicated frames.

BRIEF DESCRIPTION OF THE DRAWINGS

For a better understanding of the present invention, reference is made of a detailed description to be read in conjunction with the accompanying drawings, in which:

FIG. 5 indicates a channel/connection management table employed in the frame synchronizing/synthesizing unit according to the present invention;

FIG. 6 represents a synthesizing parameter table provided in the frame synchronizing/synthesizing unit according to the present invention;

FIG. 12 schematically shows a frame structure according to the present invention.

DESCRIPTION OF THE PREFERRED EMBODIMENTS

Referring now to drawings, various embodiments of the present invention will be described.

Figure 1:
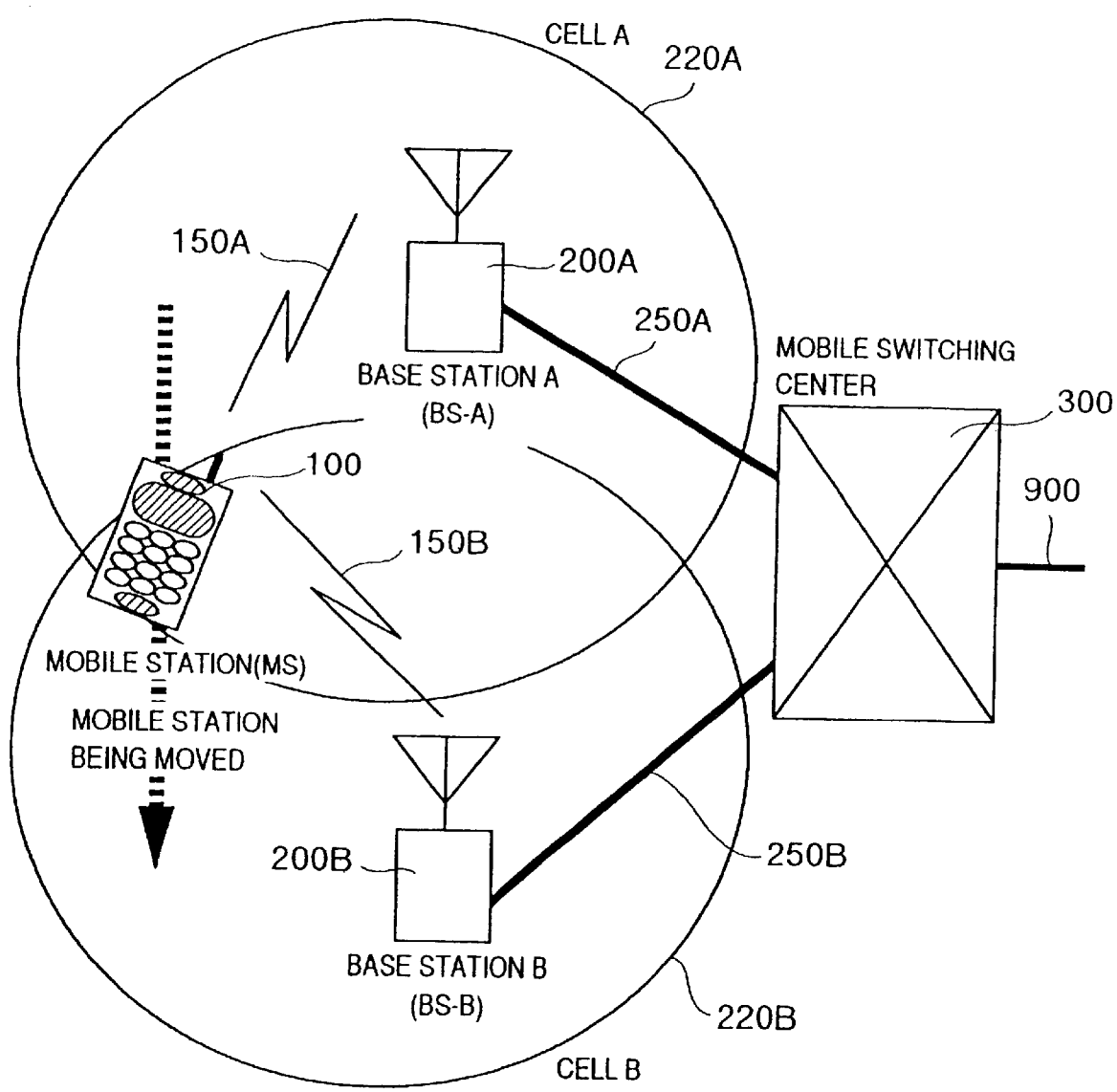
FIG. 1 illustratively shows an arrangement of a mobile communication system according to the present invention.

FIG. 1 schematically illustrates an overall arrangement of a mobile communication network system to which the present invention is applied, and schematically represents such an idea that non-instantaneous interrupt handover is carried out by embodying the present invention in this mobile communication network. This network stores a plurality of mobile stations (MSs) 100. Each of base stations (BSs) 200 is connected via a plurality of wireless (radio) lines 150 to the mobile stations 100. A cell 220 is a range in which the respective base stations can communicate with the mobile stations 100 with keeping communication qualities higher than a preselected quality. A mobile switching center (MSC) 300 stores a plurality of base stations 200 via a plurality of wire transfer paths 250. Also, the mobile switching center 300 is connected via an upper-grade network connection line 900 to an upper-grade network.

Assuming now that a mobile station 100 is being moved near an area boundary between a cell 220A and another cell 220B (mobile station is moved from cell 220A to cell 220B), and also non-instantaneous interrupt handover is initiated, the mobile station 100 will communicate via the respective wireless lines 150A and 150B to the respective base stations 200A and 200B at the same time. Communication data and control data transmitted from the mobile station 100, i.e., the same data are transferred via different paths, i.e., a path of the wireless line 150A—base station 200A—wire line 250A, and another path of the wireless line 150B—base station 200B—wire line 250B to the mobile switching center 300. In this mobile switching center 300, the present invention is applied, and the same data are synthesized or selected. On the other hand, in the mobile switching center, a duplication process operation to which the present invention is applied is carried out for the communication data and the control data transmitted from the mobile switching center 300 to the mobile station 100. The duplicated same data is transmitted via a path of the wire line 250A—the base station 200A—to wireless line 150A and another path of the wire line 250B—the base station 200B—the wireless line 150B to the mobile station 100. Then, the duplicated same data are synthesized, or selected in this mobile station.

Figure 2:
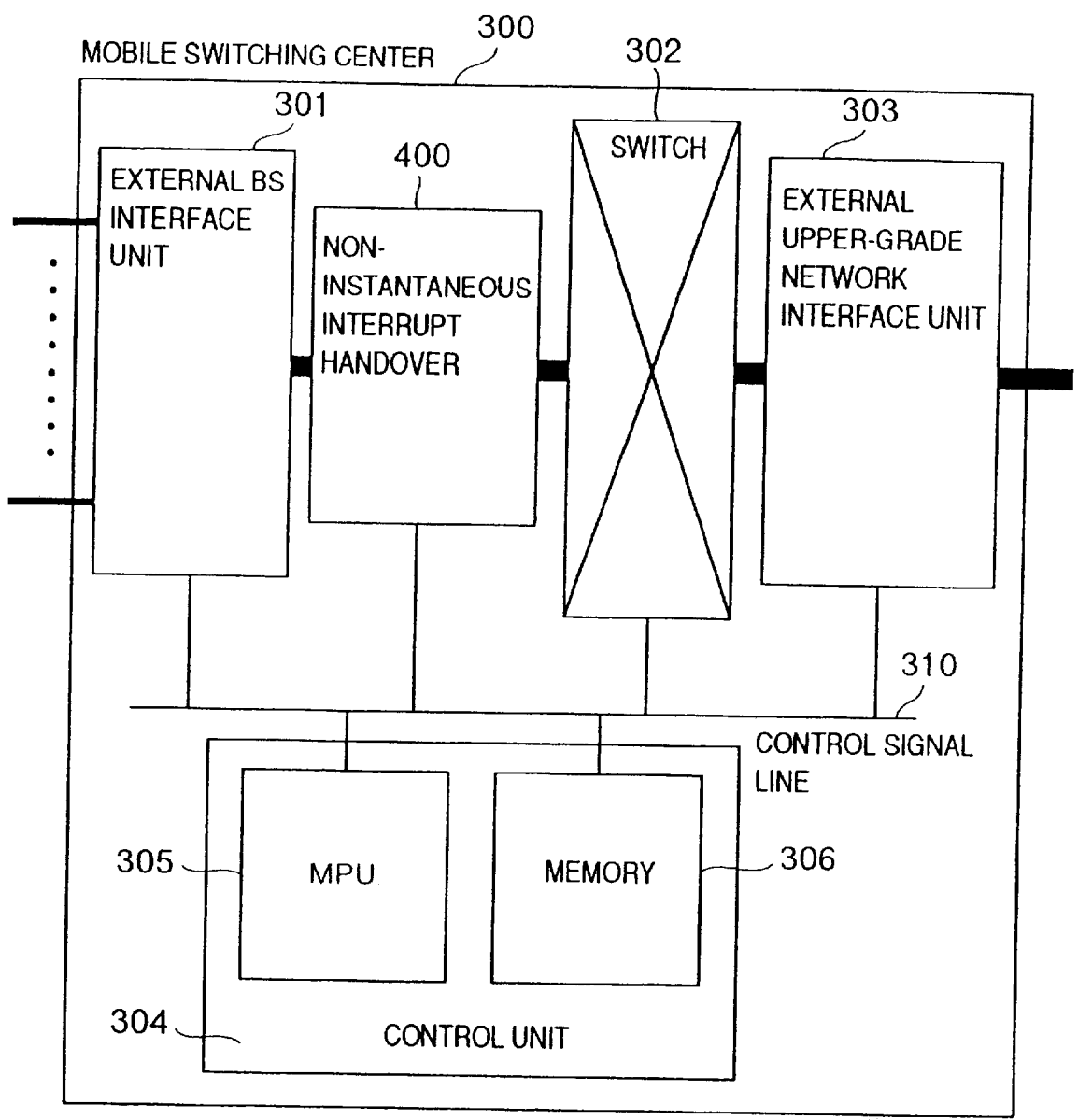
FIG. 2 is a schematic block diagram for representing an internal arrangement of a mobile switching center according to the present invention.

FIG. 2 schematically shows an arrangement of the mobile switching center 300 in which the present invention is concretely embodied.

An external BS interface unit 301 stores a plurality of wire lines 250 connected to the base station 200, and executes a data format conversion, or a frame assembling/desolving operation. For instance, in the case that a data format in the wire line 250 is an ATM cell, and a format in a non-instantaneous interrupt handover processing unit 400 is a frame format, this external BS interface unit 301 assembles the frame from the ATM cell, and vice versa. The non-instantaneous interrupt handover processing unit 400 synthesizes, or selects the same data (frame) of the up stream, which is transferred via the different paths when the non-instantaneous interrupt handover is initiated. Also, since this non-instantaneous interrupt handover processing unit 400 must transmit the same data to the different base station, this handover processing unit 400 duplicates data of the down stream. Furthermore, in such a case that both the communication data and the control data, which are transferred through the mobile switching station 300, the base station 200, and the mobile station 100 are transmitted/received with being mixed into the same frame, or the same packet, this non-instantaneous interrupt processing unit 400 separates and synthesizes these communication and control data. A switch 302 switches lines through which data is transferred between the base station side and the upper-grade network side. Alternatively, this switch 302 may be a packet switch, or an ATM switch. An external upper-grade network interface unit 303 stores a line 900 derived from the upper-grade network, and executes a data format conversion, or a frame assembling/desolving operation in a similar manner to the external BS interface unit 301. A control unit 304 controls various apparatuses inside the mobile switching center 300. The control unit 304 is arranged by a memory 3006 for saving a program and data, and an MPU 305 for actually controlling the respective apparatuses by executing a calculation process operation. A control signal line 310 is a signal line for transmitting/receiving a control signal containing also the data among the respective apparatuses within the mobile switching center 300.

Figure 3:
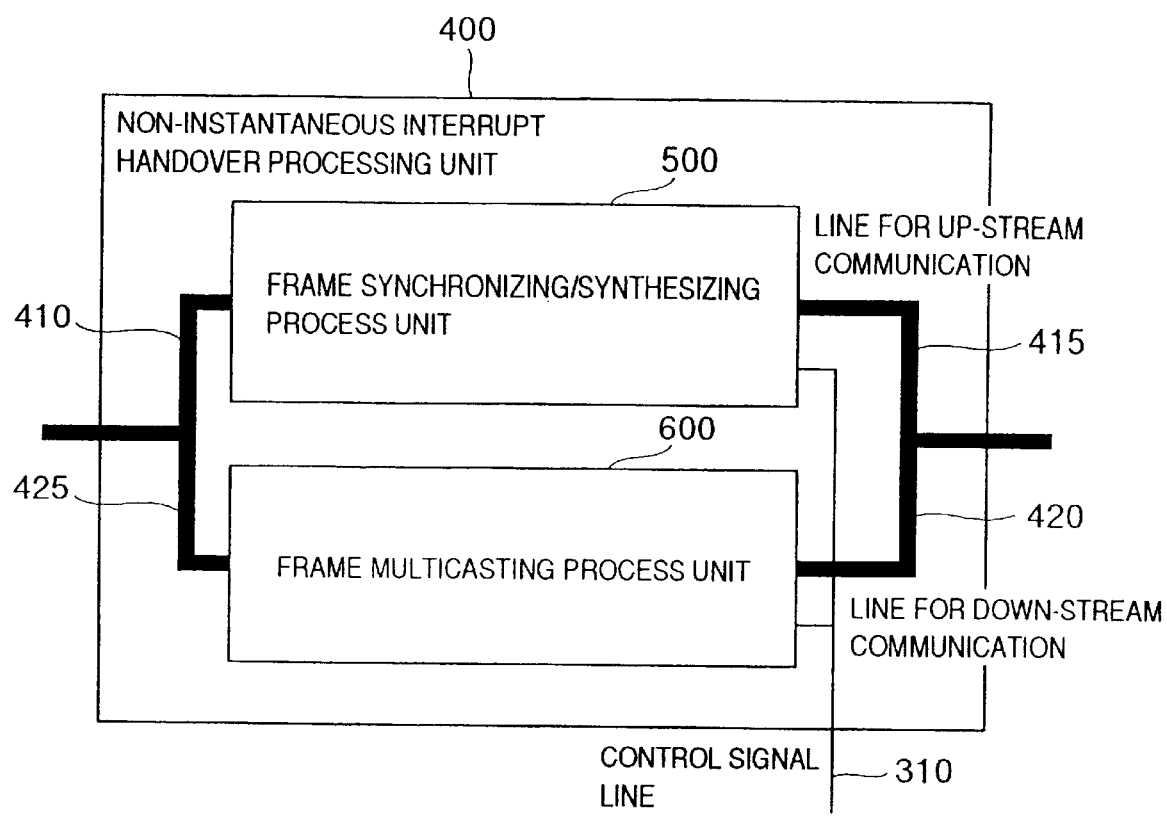
FIG. 3 is a schematic block diagram for indicating an arrangement of a non-instantaneous interrupt handover unit employed in the mobile switching center according to the present invention.

FIG. 3 schematically represents an internal arrangement of the non-instantaneous interrupt handover processing unit.

Irrelevant to initialization/non-initialization of the non-instantaneous interrupt handover, the up-stream data frame (will be referred to as an "up-stream frame" hereinafter) received from the external BS interface unit 301 is transferred to a frame synchronizing/synthesizing process unit 500. This up-stream frame indicates communication data and/or control data handled as such a frame having a fixed length or a variable length of a specific length. Also, a packet and an ATM cell will be similarly handled as frames in the following description. When the non-instantaneous interrupt handover is not initiated, the up-stream frame is transferred to the switch 302 without executing any process operations other than the header conversion. When the communication data is mixed with the control data in this up-stream frame, the communication data is separated from the control data. Thus, the separated control data is transferred to the control unit 304, and the separated communication data fame is transferred to the switch 302. When the non-instantaneous interrupt handover is initiated, a plurality of up-stream frames having the same data which have been transferred from the different base stations 200 are synchronized with each other, and then the synchronized up-stream frames are compared with synthesizing parameters given to these plural frames, so that only one optimum frame is selected to be transferred to the switch 302. When the communication data is mixed with the control data in this up-stream frame, the communication data is separated from the control data. Thus, the separated control data is transferred to the control unit 304, and the separated communication data frame is transferred to the switch 302. A synthesizing parameter implies such an index. That is, error information of a frame in a wireless section, for instance, an error rate is detected, or measured in unit of the up-stream frame received from the mobile station 100 in the base station 200, and this index indicates a quality of this frame obtained from this detection, or measurement result, which is received at the base station 200. This parameter value is given to each of the frames at the base station 200, and then is transmitted to the mobile switching center 300.

The down-stream data frame (will be referred to a "down-stream frame" hereinafter) received from the switch 302 is transferred to a frame multicasting process unit 600. In the case that the mixture of the communication data and the control data within the frame is allowed, the control data received from the control unit 304 may be synthesized with the up-stream frame (arranged by communication data) received from the switch 302. When the non-instantaneous interrupt handover is not initiated, the down-stream frame constituted in this manner is processed only by the header conversion, and then the processed down-stream frame is transferred to the external BS interface unit 301. On the other hand, when the non-instantaneous interrupt handover is initiated, in order to transmit the same data to a plurality of base stations which are connected to each other by the lines by the same call, the down-stream frame is duplicated to produce only a plurality of down-stream frames whose number is equal to the plural connections in this frame multicasting process unit 600. Then, only different headers are attached to the duplicated down-stream frames (so as to transmit data frame to different base stations), and a plurality of down-stream frames duplicated at the same timing are transmitted to the external BS interface unit 301.

It should be noted that the expression "handover" implies "non-instantaneous interrupt handover" unless a specific instruction is issued.

Figure 4:
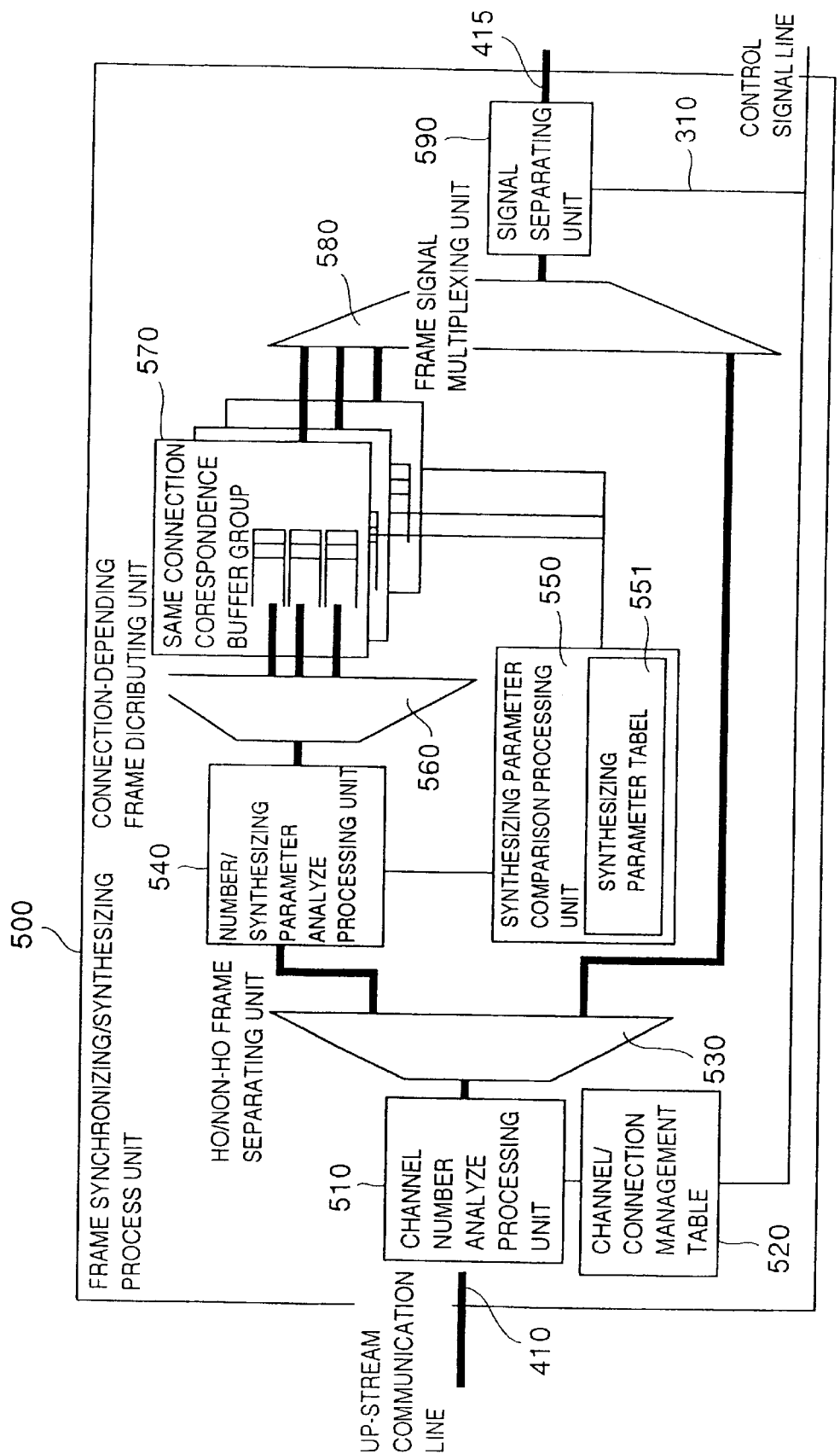
FIG. 4 is a schematic block diagram for showing an arrangement of a frame synchronizing/selecting unit employed in the non-instantaneous handover unit according to the present invention.

FIG. 4 schematically shows an internal arrangement of the frame synchronizing/synthesizing process unit 500.

A channel number processing unit 510 extracts a channel number given to a received up-stream frame, and transmits this channel number to a channel/connection management table 520. Then, a connection number, handover information, and a simultaneous connection number, which are received from this channel/connection management table 520, are newly attached to the up-stream frame which will then be transmitted to an HO/non-HO frame separating unit 530 (symbol "HO" indicates handover). A channel number corresponds to the number for specifying a channel through which a frame attached with this number is transferred between the base station 200 and the mobile switching center 300. Normally, this number is set every cell. A connection number corresponds to the number for specifying a communication between an end and an end, and is exclusively specified every call. During normal communication (namely, handover is not initiated), the channel number corresponds to the connection number in a one-to-one correspondence. While the handover is initiated, since the same data is transferred from the base station 200, a plurality of channel numbers are made in correspondence with 1 connection number. The correspondence relationship between this connection number and the channel number is set by the control unit 304 when the handover is initiated. The simultaneous connection number is such a number indicative of an n-th connection among maximum N pieces of simultaneous connections while the handover is initiated, and is saved with making a one-to-one correspondence with the channel number. When the handover is not initiated, the simultaneous connection number is always 1. The handover information indicates as to whether or not the handover process is initiated. If the handover process is initiated, then the handover information includes the maximum simultaneous connection number "N". When the handover is not initiated, N is equal to 1.

The channel/connection management table 520 is a table for saving a relationship between the above-described connection numbers and channel numbers while the call is set and thereafter is released. Furthermore, as to this call, information (handover information) for indicating whether or not the handover is initiated is also saved at the same time. All of the data managed by this table are written, saved, and deleted under control of the control unit 304. A detailed structure of this channel/connection management table 520 is shown in FIG. 5.

The HO/non-HO frame separating unit 530 recognizes initiating/not-initiating of the handover based upon the handover information of the received up-stream frame. When the handover is not initiated, this frame is transferred to a frame signal multiplexing unit 560 without being processed. When the handover is initiated, this frame is transferred to a number/synthesizing parameter analyze processing unit 540.

In the number/synthesizing parameter analyze processing unit 540 the connection number, the frame number, the synthesizing parameter, the simultaneous connection number, and the handover information (maximum simultaneous connection number N), which are attached to the frame, are extracted to be transferred to a synthesizing parameter comparison processing unit 550. On the other hand, this frame is transferred to a connection-depending frame distributing unit. A frame number corresponds to such a number for indicating a sequence of resolved frames when the up-stream data continuously transferred as to the same connection is framed (resolved) in the mobile station 100, the base station 200, or the external BS interface unit 301. When these frames are assembled to form data and information, these frames are assembled in accordance with this frame number sequence.

The synthesizing parameter comparison processing unit 550 temporarily saves this information in a synthesizing parameter table 551 based on the connection number, the frame number, the synthesizing parameter, the simultaneous connection number, and the handover information (maximum simultaneous connection number N), which are received. A detailed structure of this synthesizing parameter table 551 is indicated in FIG. 6. In the synthesizing parameter table 551, a comparison of the synthesizing parameter is commenced as to the same connection number and the same frame number when such a recognition is made that all of the synthesizing parameter numbers corresponding to the respective simultaneously connection number have been written. A selection is made of such a parameter value indicative of the smallest error rate of the frame from a plurality of synthesizing parameters to be compared, and a frame having this parameter value is selected from the up-stream frames having the same data which have been received, and whose number is equal to the maximum simultaneous connection number N. Then, a decision is made that this selected frame is transmitted to the switch 302. In a specific connection number and a specific frame number, after the frame to be selected has been determined by the above-described process operation, a signal (transmission instruction signal) for instructing either a transmission or a discard every saved frame is transmitted to a same connection correspondence buffer group 570 for temporarily saving a plurality of frames having the same connection number and the different simultaneous connection numbers.

The connection-depending frame distributing unit 560 identifies, or discriminates the connection number given to the upper frame, and transmits this frame to the relevant buffer group of the buffer group set every connection.

The same connection correspondence buffer group 570 is such a buffer group to which a plurality of buffers are allocated in correspondence with the different simultaneous connection number with respect to each of connections while the handover is initiated, the same connection correspondence buffer group 570 identifies, or discriminates the same connection number attached to the received frame, and stores this frame into a buffer corresponding to the above-explained simultaneous connection number among a plurality of buffers temporarily provided with respect to each of the simultaneous connection numbers. In response to the transmission instruction signal issued from the synthesizing parameter comparison processing unit 550, as to the plural frames having the same connection number and the different simultaneous connection numbers stored in this buffer group, the respective frames are transmitted and discarded. The transmission instruction signal instructs only a frame having a specific simultaneous connection number among a plurality of frames having the specific connection numbers, the specific frame numbers, and the different simultaneous connection numbers to be transmitted to the frame signal multiplexing unit 580, and also instructs the remaining frames having the same connection numbers to be discarded.

The frame signal multiplexing unit 580 multiplexes the non-HO frame received from the HO/non-HO frame separating unit 530, and the HO frame received from the same connection correspondence buffer group, and then transmits the multiplexed frames to a signal separating unit 590.

In the case that the received frame corresponds to such a frame that the communication data is mixed with the control data, the signal separating unit 590 extracts only the control data, and transmits this control data via the control signal line 310 to the control unit 304. On the other hand, the remaining communication data is transmitted as a frame to the switch 302 in combination with the header information.

FIG. 5 shows a data save structure of the connection/channel management table 520.

The data items saved in the connection/channel management table 520 are a connection number 521, a channel number 525, a simultaneous connection number 526, and non-instantaneous interrupt handover ON/OFF 523 and a maximum simultaneous connection number 524 as handover information 522. The information other than the instantaneous connection number 526 corresponds to information transferred from the control unit 304 when the call is set and the handover is initiated, and is deleted in response to the instruction from the control unit 304. The simultaneous connection number 526 is set from the maximum simultaneous connection number 524. For instance, when the maximum simultaneous connection number is 2, "1" and "2" are set as the simultaneous connection number 526.

FIG. 6 shows a data save structure of the synthesizing parameter table 551.

The data items saved in the synthesizing/parameter table 551 are a connection number 552, a maximum simultaneous connection number 553, a frame 554, a simultaneous connection number 555, and a synthesizing parameter 556. All of the above-described information is transferred from the synthesizing parameter comparison processing unit 550 to be saved. As to a specific connection number and a specific frame number, at the time when all of the synthesizing parameter values are saved, the synthesizing parameter value is read from the synthesizing parameter comparison processing unit 550, and then the item portion of the frame number 554, the item portion of the simultaneous connection number 555, and the item portion of the synthesizing parameter 556 related to the synthesizing parameter to be read are deleted. A series of these process operations is carried out in correspondence with the connection number and the frame number.

Figure 7:
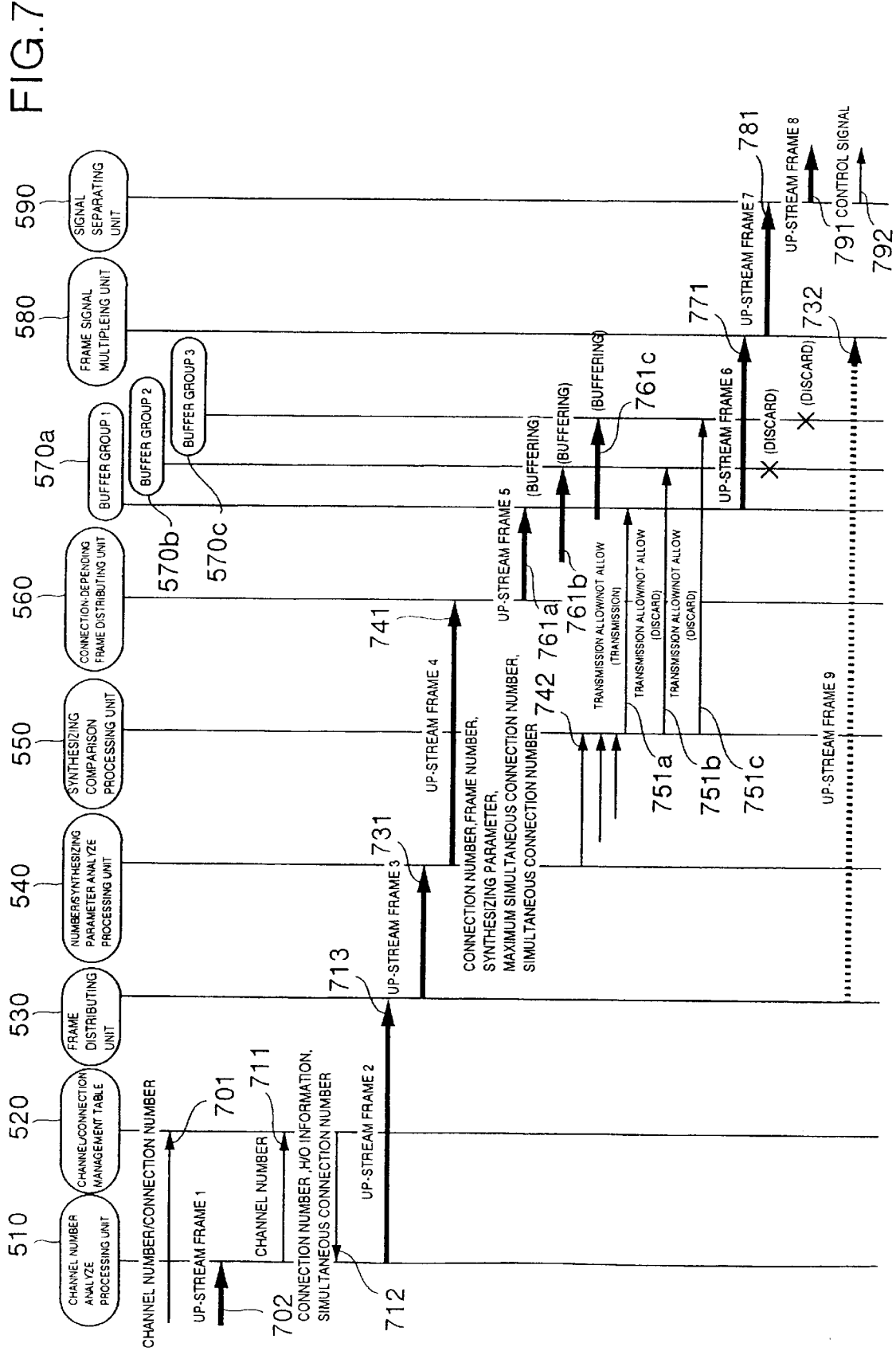
FIG. 7 is a sequence diagram for representing a data frame and signal transmission/reception executed in the frame synchronizing/synthesizing unit according to the present invention.

FIG. 7 represents a sequential operation of a frame transfer operation and a control signal transfer operation as to a specific up-stream frame of a specific call within the frame synchronizing/synthesizing process unit 500.

At the same time when the call is set, the control unit 304 transfers the channel number and the connection number related to this call to the channel/connection management table 520 (701). Also, when the handover is initiated, the handover information is transferred via a similar path. These information transmitted from the control unit 304 is temporarily saved in the channel/connection management table 520.

The channel number analyze processing unit 510 receives an up-stream frame 1 (702) constructed of the communication data, the control data, and the header information (containing channel number and frame number) from the external BS interface unit 301. This channel number analyze processing unit 510 extracts the channel number from this up-stream frame 1 (702) and transmits this channel number to the channel/connection management table 520 (711).

In the channel/connection management table 520, the connection number, the handover information, and the simultaneous connection number are read to be transmitted to the channel number analyze processing unit (712).

In the channel number analyze processing unit 510, the connection number, the handover information, and the simultaneous connection number, which are received, are attached to the up-stream frame 1 (702) as new header information, and then an up-stream frame 2 (713) is transmitted to the frame distributing unit 530.

The frame distributing unit 530 identifies whether or not the up-stream frame corresponds to a frame under initiation of the handover based on the header information (handover information) of the up-stream 2 (713). When this frame is identified as the frame under initiation of the handover, a frame 3 (713) is transmitted to the number/synthesizing parameter analyze processing unit 540. When the handover is not yet initiated, an up-stream frame 9 (732) is transmitted to a frame signal multiplexing unit 580.

The number/synthesizing parameter analyze processing unit 540 extracts from the header information of the up-stream frame 3 (731), the connection number, the frame number, the simultaneous connection number, the maximum simultaneous connection number, and the synthesizing parameter value, and then transmits these extracted information to the synthesizing parameter comparison processing unit 550 (742). The up-stream frame 3 (731) is transmitted as an up-stream frame 4 (741) having a similar format to the connection-dependent frame distributing unit 560.

In the synthesizing parameter comparison processing unit 550, synthesized information received from the number/synthesizing parameter analyze processing unit 540 is temporarily saved in the synthesizing parameter table 551. In the synthesizing parameter table 551, when all of the synthesizing parameters whose number is equal to the maximum simultaneous connection number related to a single handover are received and saved, a plurality of these synthesizing parameter values are read. Such a value for indicating the frame having the smallest error rate is selected, and a decision is made that only an up-stream frame having the simultaneous connection number related to this parameter value is selected and transmitted. As to the up-stream frames related to other simultaneous connection numbers, a decision is made that these up-stream frames are discarded. After the transmission and the discard are determined, a transmission allow/not allow signal 751 for instructing the frame transmission or the frame discard is transmitted to the respective buffers of the relevant connection in the same connection-depending buffer group 570.

In the connection-depending frame distributing unit 560, an up-stream 5 (761) similar to the up-stream frame 4 (741) is transmitted from the header information (connection information) of the received up-stream frame 4 (741) to the relevant same connection-depending buffer group 570.

The same connection-depending buffer group 570 owns buffers whose number is equal to the maximum simultaneous connection number every same connection, and stores the frame 5 (761) into the corresponding buffer from the simultaneous connection number equal to the header information of the up-stream frame 5 (761). Then, in the case that a transmission allow-not allow signal 751a for instructing the frame transmission is received from the synthesizing parameter comparison processing unit 550, an up-stream frame 6 (771) similar to the up-stream frame 5 (761) is transmitted to the frame signal multiplexing unit 580. On the other hand, when transmission allow/not allow signals 751b and 751c for instructing frame discards are received from the synthesizing parameter comparison processing unit 550, the frame discarding process operations are carried out in the respective buffers.

The frame signal multiplexing unit 580 multiplexes the up-stream frame 6 (771) received from the same connection-depending buffer group 570, and the up-stream frame 9 (731) received from the frame distributing unit 530 as a frame 7 (781) having a similar format, and thereafter transmits this processed frame 7 to the signal separating unit 590.

When the received up-stream frame 7 (781) is such a frame made by mixing the communication data with the control data, the signal separating unit 590 extracts the control data and transmits this extracted control data as a control signal 792 to the control unit 304. A frame constructed of the communication data and the header information is transmitted as an up-stream 8 (791) to the switch 302.

Figure 8:
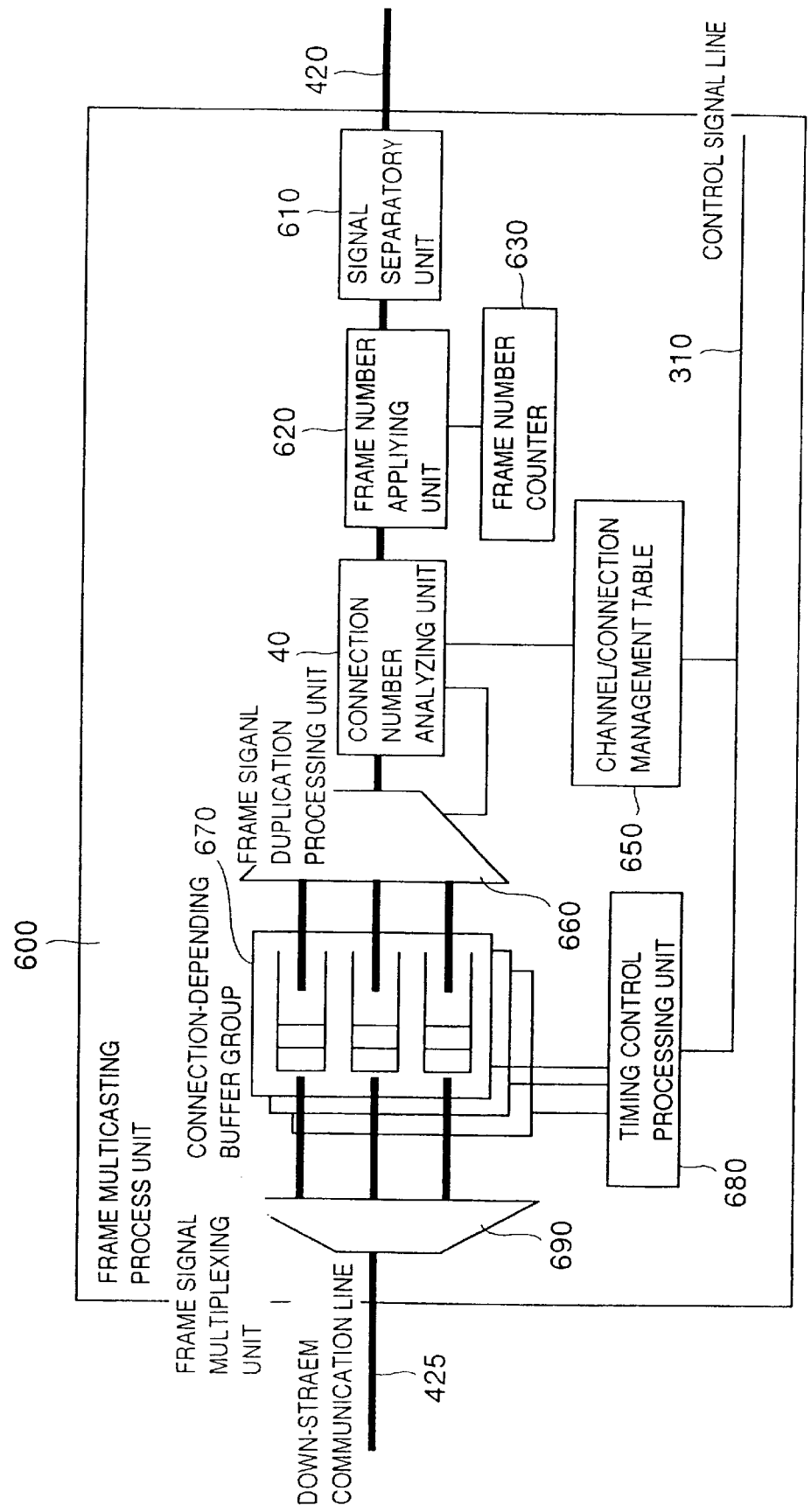
FIG. 8 is a schematic block diagram for showing an internal arrangement of a frame multicasting unit employed in the non-instantaneous handover unit according to the present invention.

FIG. 8 shows an internal arrangement of the frame multicasting process unit 600.

A signal synthesizing unit 610 synthesizes control data for controlling the mobile station 100, which is received from the control unit 304, with respect to such a down-stream data frame (will be referred to as a "down-stream frame" hereinafter) which contains only the communication data except for the header and received from the switch 302. The down-stream frame transmitted from the signal synthesizing unit 610 may allow that the communication data is mixed with the control data due to this synthesization. After this synthesization, this shown-stream frame is transmitted to a frame number applying unit 620.

The frame number applying unit 620 recognizes and extracts the connection number applied to the header of the received down-stream frame, and then transmits the extracted connection number to a frame number counter 630. Thereafter, a frame number returned from the frame number counter 630 is newly applied to this frame, and the resulting frame is transmitted to a connection number analyzing unit 640.

In the frame number counter 630, a sequential number counter is held every connection number. This counter is held when the call setting operation is commenced until the call is released. The frame number counter 630 identifies the connection number received from the frame number applying unit 620, reads out the present counter value of this identified connection number, and then returns this present counter value to the frame number applying unit 620. At the same time, the count value is counted up.

A connection number analyzing unit 640 identifies and extracts the connection number of the down-stream frame received from the frame number applying unit 620, and transmits the extracted connection number to a channel/connection management table 650. Thereafter, the connection number analyzing unit 640 receives the handover information and the channel number from this management table 650. The information related to these down-stream frame is transmitted to a frame signal duplication processing unit 660 irrelevant to the down-stream frame. When the handover is initiated, the above-described channel number becomes plural. On the other hand, the down-stream frame is transmitted to the frame signal duplication processing unit 660 without being specifically processed.

The channel/connection management table 650 is similar to the channel/connection management table 520 provided inside the frame synchronizing/synthesizing process unit 500. Alternatively, both the channel/connection management tables 520 and 650 may be made as a single table which is commonly used in the frame synchronizing/synthesizing process unit 500 and the frame multicasting process unit 600.

The frame signal duplication processing unit 660 receives the down-stream frame and also various information (handover information and channel number) related to this down-stream frame from the connection number analyzing unit 640. In the case that the frame signal duplication processing unit 660 recognizes that a call related to this frame is under initiation of the handover based on this down-stream frame, this frame signal duplication processing unit 660 duplicates down-stream frames whose number is equal to the maximum simultaneous connection number corresponding to a portion of the handover information. Since the different channel numbers which have already been received are newly applied to the duplicated down-stream frames, the multicasted base stations are specified. Furthermore, the duplicated frames are transmitted to the corresponding connection-depending buffer group 670 based on the applied connection numbers (since all of connection numbers of duplicated frames have the same values, these duplicated frames are transmitted to the same buffer group). On the other hand, when the handover is not initiated, no frame duplication is carried out. However, the channel number is newly applied to the received frame, and the resulting frame is transmitted to the corresponding connection-depending buffer group 670.

The connection-depending buffer group 670 is similar to the connection-depending buffer group 570 provided in the frame synchronizing/synthesizing process unit 500, and the process operation of which is similar to that of the frame synchronizing/synthesizing process operation. It should be noted that all of timing control signals received from a timing control processing unit 680 are such signals for instructing transmissions. Upon receipt of this timing control signal, the down-stream frames of the same frame numbers are transmitted from the respective buffers related to the same connection, so that the multicasting operation is performed at this timing. Also, when the handover is not yet initiated, the timing control signal is received in a similar manner, and the down-stream frame is transmitted.

When a call is set and/or a communication is established, the timing control processing unit 680 receives frame transmission timing information related to this call from the control unit 304, and transmits a timing control signal based upon this frame transmission timing information to the same connection-depending buffer group 670.

The frame signal multiplexing unit 690 multiplexes a plurality of down-stream frames received from the same connection-depending buffer group 670, and then transmits the multiplexed down-stream frame to the external BS interface unit 301.

Figure 9:
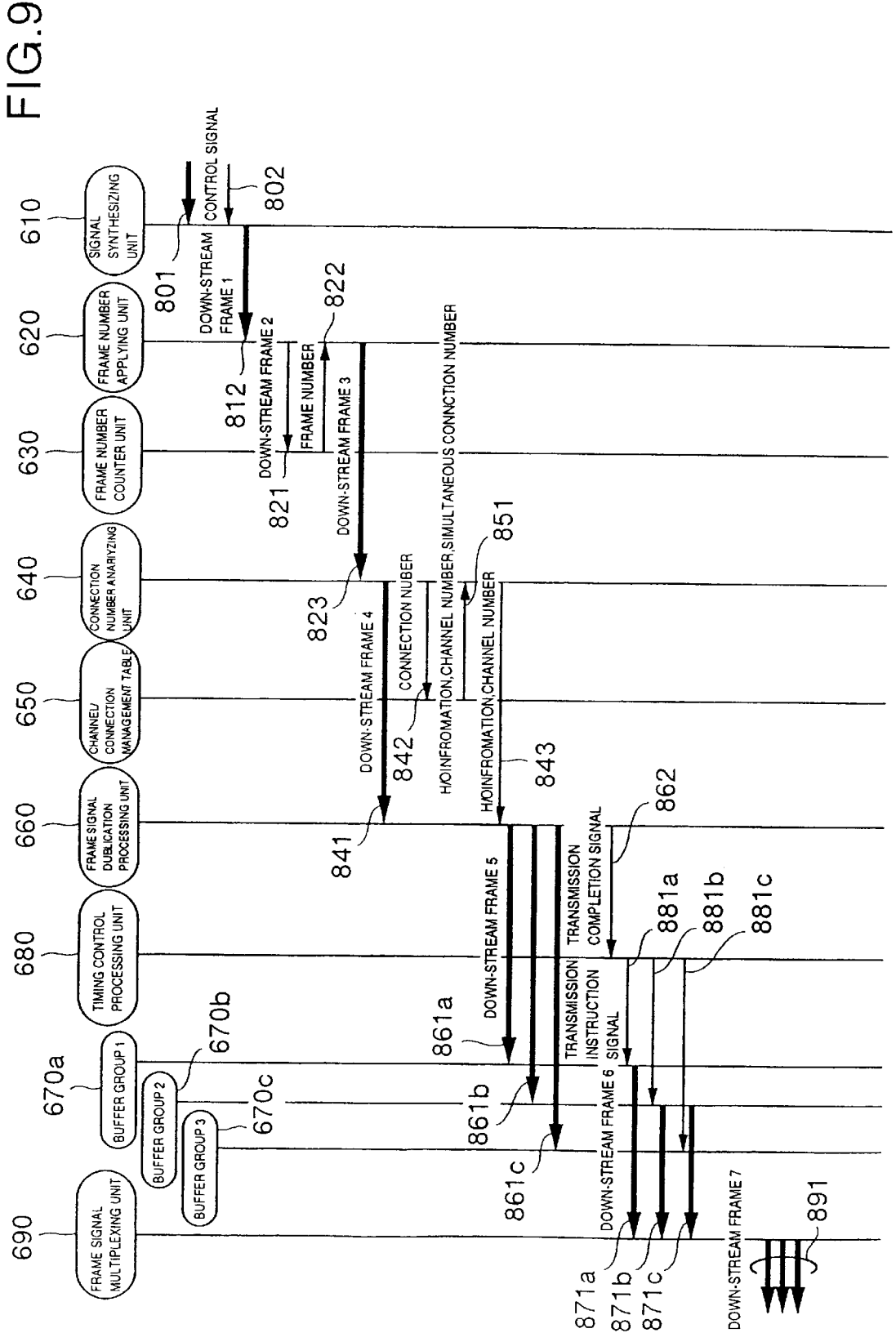
FIG. 9 is a sequence diagram for representing a data frame and a signal transmission/reception executed in the frame multicasting unit according to the present invention.

FIG. 9 represents a frame transfer operation related to a specific down-stream frame of a specific call, and also a control signal transfer sequence within the frame multicasting process operation.

The signal synthesizing unit 610 synthesizes a down-stream frame 1 (801) received from the switch 302 with a control signal 802 received from the control unit 304, and then transmits the synthesized frame as a down-stream 2 (812) to the frame number applying unit 620. The down-stream frame 1 (801) is constructed of the communication data and the header information (connection number is contained). The control signal 802 is arranged by control data used to control the mobile station 100 from mobile switching center 300.

The frame number applying unit 620 extracts the connection number from the header information of the down-stream frame 2 (812) received from the signal synthesizing unit 610, and transmits the extracted connection number to the frame number counter unit 630 (821). Thereafter, a frame number 822 returned from the frame number counter unit 630 is added as new header information of this down-stream frame 2 (812), and the added frame is transmitted as a down-stream frame 3 (823) to the connection number analyzing unit 640.

The frame number counter unit 630 judges whether or not the down-stream frame corresponds to any counter provided every connection based upon the received connection number, reads out a counter value of the corresponding counter, and then returns the read counter value to the frame number applying unit 620. After the counter value is read out, this counter value is counted up.

The connection number analyzing unit 640 extracts the connection number from the header information of the down-stream frame 3 (823) received from the frame number applying unit 620, and then transmits the extracted connection number to the channel/connection management table 650. Thereafter, in response to the connection number 842, the handover information, channel number, and simultaneous connection number are received (851), and each of the above-described information is transmitted to the frame signal duplication processing unit 660 (843). On the other hand, the down-stream frame 3 (823) is transmitted as a frame 4 (841) having a similar format to the frame signal duplication processing unit 660.

The channel/connection management table 650 owns a similar operation to that of the channel/connection management table 520 employed in the frame synchronizing/ synthesizing process unit 500.

As the down-stream frame 4 (841) and information (843) related to this down-stream frame, the frame signal duplication processing unit 660 receives handover information, a channel number, and a simultaneous connection number. When such a fact that the handover is initiated is identified from the handover information, the frame signal duplication processing unit 660 duplicates the down-stream frames 4 (841) whose number is equal the maximum simultaneous connection number contained in this handover information. To the duplicated down-stream frames 4 (841), channel numbers and simultaneous connection numbers are newly added as header information. These channel numbers specify the base stations and the channels for the transmission destination. After these process operations are executed, down-stream frames 5 (861) are transmitted to the respective buffers of the corresponding same connection number buffer group 670 from the connection number and the simultaneous connection number, which are equal tot he header information of the down-stream frames 5 (861) duplicated from the down-stream frames 4 (841). When the handover is not yet initiated, the frames are not duplicated. However, similar frames 5 (861) are transmitted to the same connection number buffer group 670. On the other hand, after the above-explained down-stream 5 (861) has been transmitted, a transmission completion signal 862 is transmitted to the timing control unit 680. Accordingly, such a fact that the transmission of the down-stream frames 5 (861) is completed is transferred. It should be understood that the transmission completion signal 862 also contains the connection number, the maximum simultaneous connection number, and the frame number.

Upon receipt of the transmission completion signal 862, the timing control processing unit 680 transfers by using a transmission instruction signal 881, such a fact that all of the down-stream frames 5 (861) having the frame numbers corresponding to the down-stream frames 5 (861) stored in the respective buffers of a specific same connection-depending buffer group 670 are transmitted based upon a connection number, a maximum simultaneous connection number, and a frame number of internal information of this transmission completion signal 862. The timing at which the transmission instruction signal 881 can be transmitted is notified from the control unit 304 when the call is set, or when the handover is initiated, and the transmission instruction signal 881 s transmitted at this timing information.

When the transmission instruction signal 881 is received from the timing control processing unit 680, each of the buffers which have stored the down-stream frames 5 (861) of the same connection-depending buffer group 670 transmits the down-stream frame 5 (861) having the relevant frame number to the frame signal multiplexing unit 690 as a down-stream frame 6 based upon a frame number equal to the internal information of this transmission instruction signal 881.

The frame signal multiplexing unit 690 multiplexes the down-stream frames 6 (871) transmitted from the same connection-depending buffer group 670 as a down-stream frame 7 (891), and transmits the multiplexed down-stream frame 7 (891) to the external BS interface unit 301.

Figure 10:
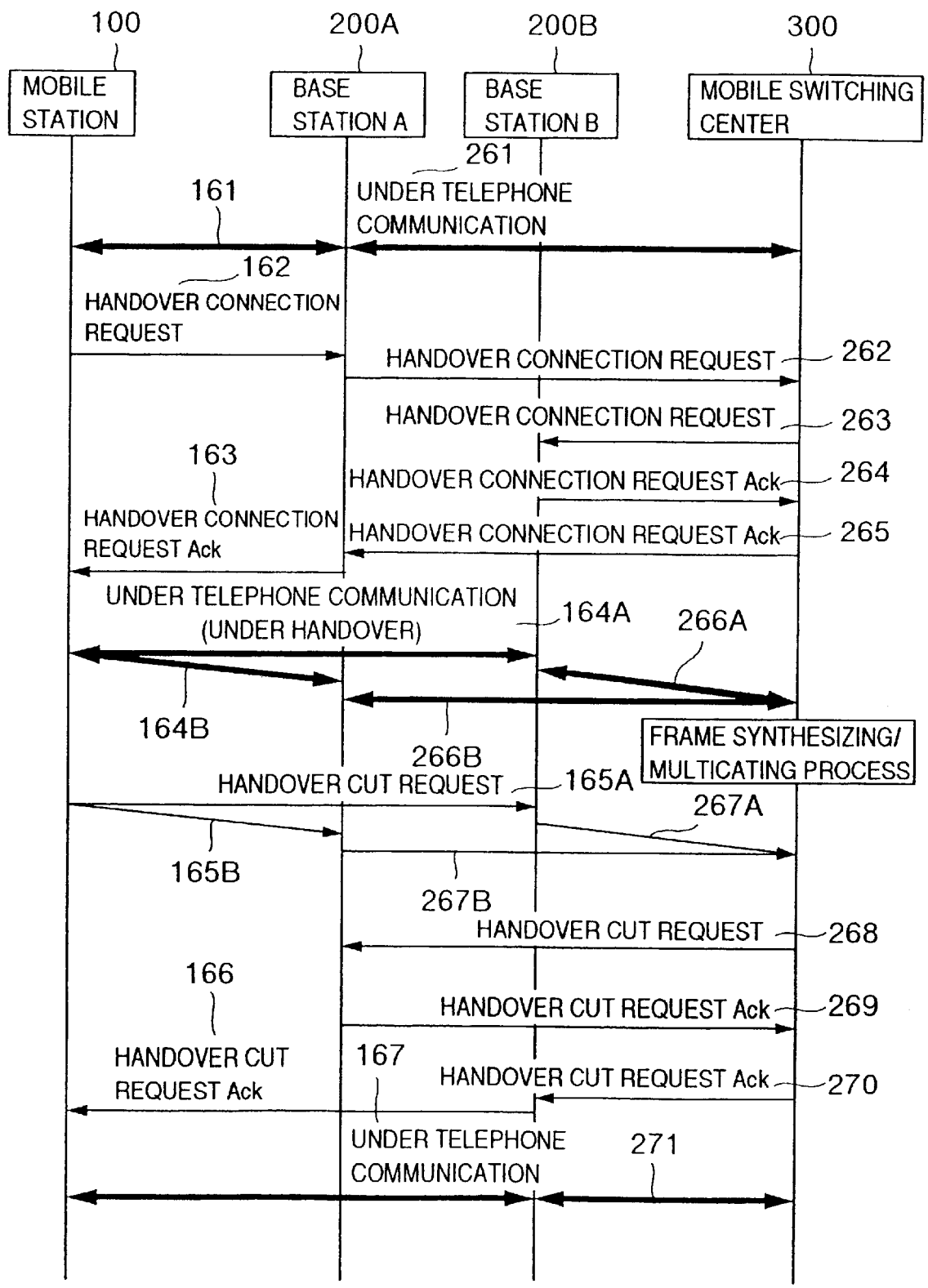
FIG. 10 is a diagram for showing a sequential operation of the non-instantaneous interrupt handover according to the present invention.

FIG. 10 schematically indicates a control signal transmission/reception sequence when soft handover is initiated in a mobile communication network system to which the present invention is applied.

While a communication (161, 261) is executed among the mobile station 100, a base station A200A, and the mobile switching center 300, this mobile station 100 initiates the soft handover. First, the mobile station 100 transmits to the base station A200A, a handover connection request message (162) containing information for identifying a newly communicatable base station B200B. Similar to the mobile station, this base station A200A transmits a handover connection request message 262 to the mobile switching center.

The mobile switching center 300 which has received this handover connection request message analyzes the information for identifying the newly communicatable base station B200B contained in this message, and then transmits another handover connection request message 263 to this base station 200B. The base station 200B which have received this handover connection request message 263 judges as to whether or not a resource of a wireless section can be allocated, for instance, a wireless channel and a hard resource employed in this base station can be allocated. When the base station B200B judges that the resource can be allocated, this base station B200B transmits a handover connection request Ack 264 containing the allocated wireless channel information to the mobile switching counter 300. The mobile switching center 300 which has received this message connection request Ack 264 allocates a channel between the base station 200 and the mobile switching center 300, and then causes a channel number of this allocated channel to be stored into the channel/connection management table 520 shown in FIG. 6 in relation to a connection number. Also, the mobile switching center 300 sets non-instantaneous interrupt handover On/Off information 523 corresponding to one of the handover information 522 contained in this management table 520 from "Off" to "On", and changes the maximum simultaneous connection number 524 from "1" to "2", so that the simultaneous connection number 526 related to the newly added channel number is set to "2".

After the setting operation of the channel/connection management table 520 has been completed, the mobile switching center 300 transmits a handover connection request Ack message 265 to the base station A200A. The base station A200A which has received this message 265 will transmit a handover connection request Ack message 163 to the mobile station 100. The mobile station 100 which has received this request message will recognize that soft handover with the base station B200B is available, and commences the communications at the same time with respect to the base station A200A and the base station B200B.

Both the base stations A and B communicate with the mobile switching center 300, and the mobile switching center 300 causes the up-stream frames received from the respective base stations to be frame-synthesized in the frame synchronizing/synthesizing unit 500. Also, the down-stream frames transmitted to the respective base stations are duplicated and transmitted in order that the duplicated down-stream frames can be transmitted to the respective base stations in the frame multicasting process unit 600 shown in FIG. 8.

When the line quality with respect to the base station A200A is lowered, the mobile terminal 100 transmits handover cut request messages 165A and 165B containing the information for identifying the base station B200B so as to request that the line connected to the base station A200A is cut. Similarly, both the base stations 200A and 200B which have received this handover cut request messages 165A and 165B will transmit handover cut request messages 267A and 267B to the mobile switching center 300. In the mobile switching center 300, these handover cut request messages 267A and 267B are synthesized to produce a single message in the frame synchronizing/synthesizing processing unit 500. Thereafter, this single message is analyzed, and a handover cut request message 268 is transmitted together with information for identifying the base station 200A, which is contained in this single message, to the base station A200A. The base station A200A which has received this message 268 accomplishes the communication with the mobile station 100, and then transmits a handover cut request Ack message 269 to the mobile switching center 300 in order to notify the completion of this communication. Similarly, the mobile switching center 200 transmits the handover cut request Ack message to the base station B200B, and this base station B200B transmits this message to the mobile station 100. Then, this mobile station 100 recognizes that the handover is ended, and continues the communication only with the base station B200B (167).

Figure 11:
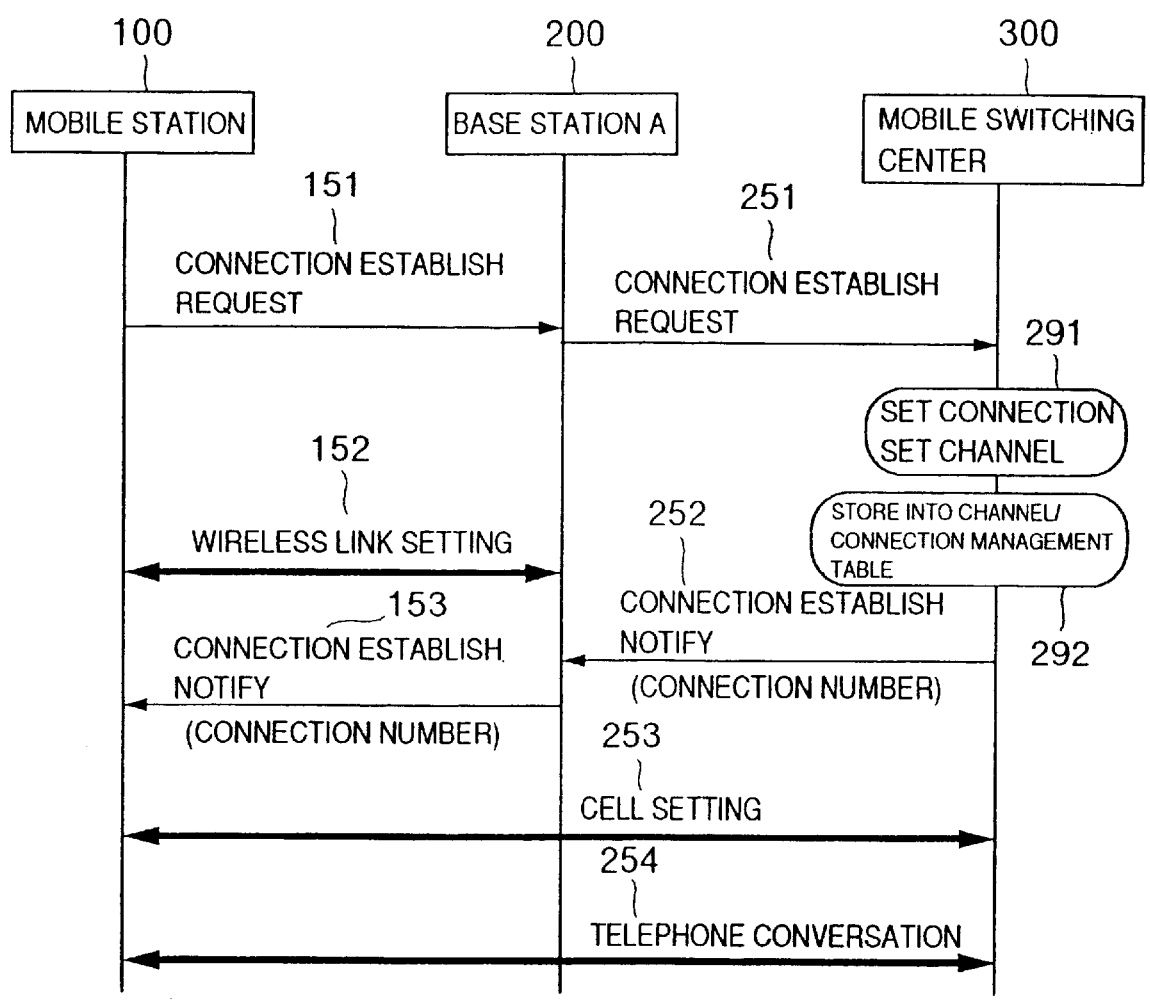
FIG. 11 is a diagram for indicating a sequential operation of connection setting according to the present invention.

FIG. 11 indicates a sequence defined when the mobile station 100 issues a call, and then a connection and a channel is set to thereby establish a communication.

The mobile station 100 transmits connection establish request message 151 and 251 via the base station 200 to the mobile switching center 300 when the call is issued. The mobile switching station 300 which has received this connection establish request message 251 recognizes that the mobile station 100 requests to issue a call, and at the same time, sets the connection with this mobile station 100. Also, this mobile switching center 300 allocates a channel in order to communicate with the base station 200. A connection/channel relationship when the connection is set and the channel is allocated is written into the channel/connection management table 520 shown in FIG. 5, and is held until this connection is released (292).

The mobile switching center 300 when the connection and the channel have been set transmits a connection establish notify message 252 containing these connection number and channel number to the base station 200. Then, the base station 200 recognizes such a channel that the communication is subsequently carried out based on the channel number contained in this message 252. Thereafter, the base station 200 transmits a connection establish notify message 153 containing the connection number to the mobile station 100. Since the mobile station 100 receives this notify message 153, this mobile station 100 recognizes that the connection between this mobile station 100 and the mobile switching station 300 can be established, and at the same time, holds this connection number until the connection is released.

After the connection has been established between the mobile terminal 100 and the mobile switching center 300, a call is set (253) and thus a telephone communication is commenced (254).

FIG. 12 represents a structure of a frame transmitted/received between the mobile terminal 100 and the non-instantaneous interrupt handover processing unit 400 employed in the mobile switching station 300.

An up-stream line frame is arranged by user information 101 on which voice and user specific information are mounted when being transmitted from the mobile terminal 100, control information 792 used to control the line with the mobile switching center 300, and a frame number 554 used to specify a sequence of frames to be transmitted. In the base station 200 which has received this frame, error information in the wireless section of this up-stream line frame when being received is produced, and then this error information is applied to this frame as a synthesizing parameter 556. Also, a specific channel number 525 allocated so as to transmit this up-stream line frame to the mobile switching station 300 is also attached. The frame produced by the above-explained process operation is received by the non-instantaneous interrupt handover processing unit 400 of the mobile wireless station 300. Further, the connection number 521, the handover information 522, and the simultaneous connection number 526 are applied to this received frame by executing the process operations shown in FIG. 4 and FIG. 7 in the frame synthesizing/synthesizing process unit 500 equal to the internal process unit.

When a down-stream line frame is received by the non-instantaneous interrupt handover processing unit, this down-stream line frame is constructed of the user information 101 and the control information 792. Since this down-stream line frame is processed by the process operations as described in FIG. 10 and FIG. 11, the connection number 521, the frame number 554, and the channel number 525 are attached, and thereafter the resulting frame is transmitted to the base station 200. The base station 200 which has received this down-stream line frame transmits such a frame from which the channel number 525 corresponding to the information irrelevant to the mobile station 100 has been deleted to the mobile station 100.

As previously described in detail, according to the present invention, in the mobile communication network in which the ATM-processed transfer paths are present between the mobile stations and the mobile switching center, even when each of the frames (containing ATM cell, short cell, and packet) involving the data sent from the mobile stations is received in the asynchronous manner, the connection can be specified from the header information related to this frame, and the information saved in the mobile switching center. Also, it is possible to identify in unit of the frame as to whether or not the handover is initiated in this connection. As a consequence, the plural frames containing the same data during the non-instantaneous interrupt handover can be compared and selected, which could be conventionally realized only in the STM system. Also, since the frames containing the duplicated data which should be transmitted from the mobile switching center to the mobile terminal are simultaneously transmitted at the specific timing, the frames can be easily selected and synthesized in either the base station on the reception side or the mobile stations in a similar manner to the STM system. Furthermore, the non-instantaneous interrupt handover which could be realized only in the STM system can also be realized in the ATM system.

What is claimed is:

1. A switching center connected to a plurality of base stations, a plurality of said base stations communicated with a plurality of wireless stations, said switching center comprising:

a initiating unit which initiates a handover process operation in order that while any of said wireless stations is connected to a first base station, said any wireless station should be newly connected to a second base station irrelevant to said first base station;

a receiver unit which receives a first packet, which is converted information from said wireless station into by said first base station, transmitted by said first base station and a second packet, which is converted information from said wireless station into by said second base station, transmitted by said second base station;

a buffer unit which temporarily stores said first packet and said second packet, which are received at asynchronous timing, so as to be synchronized with each other;

a calculating unit which calculates error rates of said first and second packets synchronized with each other;

a selecting unit which selects such an packet whose error rate is lower than that of the other packet; and a cutting out unit which cuts out the connection between said wireless station and said first base station when such a condition that the error rate of said second packet exceeds the error rate of said first packet becomes a normal condition.

2. A switching center as claimed in claim 1, further comprising:

a discarding unit which discards the packet having the worse error rate.

3. An information processing station connected to a plurality of base stations communicated with a mobile wireless station, for processing communication information transmitted from said base stations, comprising;

a receiver unit which receives asynchronous frames which are superimposed information respectively derived from the same mobile wireless station and then are transferred by said plurality of base stations;

a buffer unit which temporarily stores said asynchronous frames received in the asynchronous timing so as to be synchronized with each other; and a selector unit which selects an asynchronous frame having a better condition from said asynchronous frames stored by said buffer unit.

4. A switching center as claimed in claim 3, wherein said selector unit selects an asynchronous frame having a better condition from said asynchronous frames having the same transmission order has been added by said mobile wireless station.

5. A mobile communication system as claimed in claim 4, wherein said transmission order corresponds to a connection number specifically determined every time a single communication is established.

6. A mobile communication system as claimed in claim 4, further comprising:

a judging unit which judges information for indicating whether or not the handover process operation is under initiation, which is added to said frame by said mobile station;

wherein said buffer unit stores the asynchronous frames transferred from the same mobile station via said plurality of base stations when said judgement result indicates that the handover process operation is under execution, and said selector unit selects such an asynchronous frame having a better condition, and outputs the selected asynchronous frame, whereas when said judgement result indicates that the handover process operation is not under execution, said information processing station directly outputs the received asynchronous frame.

7. A switching center for executing a handover processing method for a plurality of base stations communicated with a mobile wireless station, said switching center comprising;

a recognizing unit which recognizes which connection between two among said stations a frame containing data to be transmitted to the mobile wireless terminals belongs to;

a applying unit which applies such a number indicative of the same frame transmission order to a frame which is judged as the same connection by said recognizing unit;

a duplicating unit which duplicates the frame to which the frame transmission order number has been applied to obtain a plurality of such frames whose number is equal to a total number of said base stations which execute the handover process operation; and a synchronizing unit which synchronizes the duplicated frames with each other and transmitting the synchronized duplicated frames.

* * * * *